(12) United States Patent
Merchant et al.

(10) Patent No.: US 6,772,322 B1
(45) Date of Patent: Aug. 3, 2004

(54) METHOD AND APPARATUS TO MONITOR THE PERFORMANCE OF A PROCESSOR

(75) Inventors: Amit Merchant, Portland, OR (US);
Selim Bilgin, Beaverton, OR (US);
Brinkley Sprunt, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/489,141

(22) Filed: Jan. 21, 2000

(51) Int. Cl.[7] .............................................. G06F 15/00
(52) U.S. Cl. .................... 712/227; 712/244; 714/37; 717/127
(58) Field of Search ................................ 712/227, 244; 714/37; 717/127

(56) References Cited

U.S. PATENT DOCUMENTS 5,263,153 A * 11/1993 Intrater et al. .............. 712/227
5,933,618 A * 8/1999 Tran et al. ................... 712/217
5,987,598 A * 11/1999 Levine et al. ............... 712/227
6,351,724 B1 * 2/2002 Klassen et al. ............. 702/180

OTHER PUBLICATIONS

Intel Corporation, Pentium Processor Family Developer's Manual, 1997, chapter 16, pp. 16–1:16–35.*

* cited by examiner

Primary Examiner—Eddie Chan
Assistant Examiner—Tonia L. Meonske
(74) Attorney, Agent, or Firm—Blakely, Sokoloff, Taylor & Zafman LLP

(57) ABSTRACT

A method and apparatus to monitor the performance of a processor. A performance specifier specifies a performance data corresponding to the performance. The performance data includes an event and an instruction causing the event. A tag generator is coupled to the performance specifier to generate a performance tag associated with the instruction. The performance tag is stored in a storage. A retirement performance monitor is coupled to the storage to extract the performance tag when the instruction is retired.

24 Claims, 5 Drawing Sheets

METHOD AND APPARATUS TO MONITOR THE PERFORMANCE OF A PROCESSOR

BACKGROUND

1. Field of the Invention

This invention relates to microprocessors. In particular, the invention relates to a performance monitor.

2. Description of Related Art

Performance monitors detect and count specific events in a micro circuit such as a microprocessor. By accumulating and reporting different types of events, it is possible to produce a performance profile for an operating system or applications. This enables a software architect to fine tune the code of the applications or the operating system to improve performance. Examples of events detected by such monitors include on-chip cache miss, instruction cache miss, load buffers full, store buffers full, etc.

As microprocessor technology is becoming more and more advanced, existing performance monitors may not provide satisfactory results. Advanced microprocessors typically have speculative architecture and high degree of complexity.

For a speculative processor, performance data from such monitors include actual as well as speculative information. Speculative information may be correctly predicted or mispredicted. When there is mis-prediction, performance data may be erroneously reported.

In addition, complexity in hardware architecture of modern microprocessors creates difficulties in monitoring performance. Highly integrated processors have multiple functional units designed to support many instructions. Monitoring effects of instruction execution at these functional units is complex and requires extensive supporting circuits.

Therefore, there is a need to have a performance monitor that can eliminate errors in speculative processing and improve efficiency.

SUMMARY

The present invention is a method and apparatus to monitor performance of a processor. A performance specifier specifies a performance data corresponding to the performance. The performance data includes an event and an instruction causing the event. A tag generator is coupled to the performance specifier to generate a performance tag associated with the instruction. The performance tag is stored in a storage. A retirement performance monitor is coupled to the storage to extract the performance tag when the instruction is retired.

BRIEF DESCRIPTION OF THE DRAWINGS

The features and advantages of the present invention will become apparent from the following detailed description of the present invention in which.

DESCRIPTION

Figure 1:
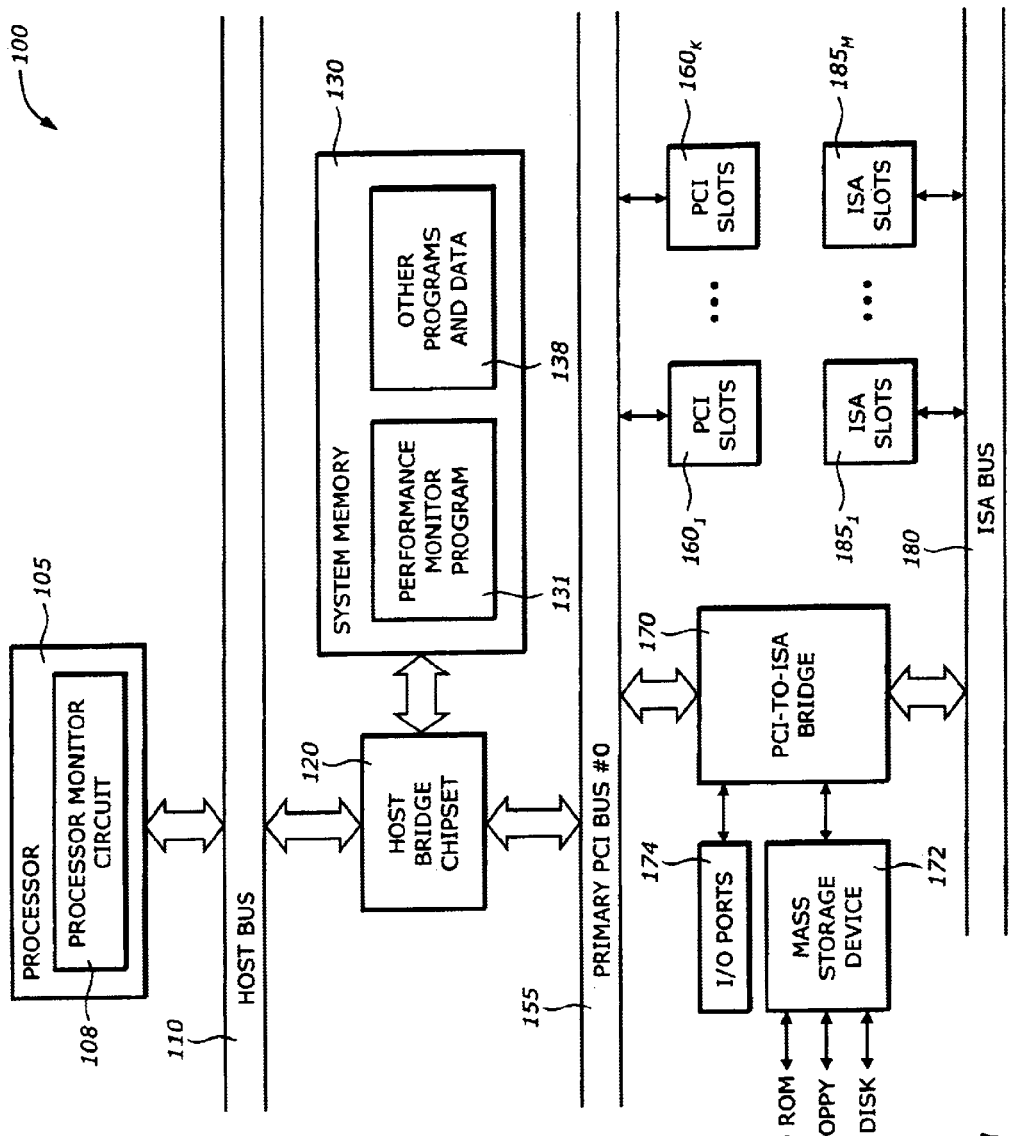
FIG. 1 is a diagram illustrating a computer system in which one embodiment of the invention can be practiced.

The present invention is a method and apparatus to monitor performance of a processor. A performance specifier specifies a performance data corresponding to the performance. The performance data includes an event and an instruction causing the event. A tag generator is coupled to the performance specifier to generate a performance tag associated with the instruction. The performance tag is stored in a storage. A retirement performance monitor is coupled to the storage to extract the performance tag when the instruction is retired.

In one embodiment, the performance specifier comprises an event specifier and an instruction specifier. The event specifier specifies the event. The instruction specifier specifies the instruction causing the event. The tag generator comprises an event detector, an instruction detector, and a tag combiner. The event detector is coupled to the event specifier to match the specified event with an occurring event generated from a functional unit. The event detector generates an event match tag. The instruction detector is coupled to the instruction specifier to match the specified instruction with an executed instruction. The instruction detector generates an instruction match tag. The executed instruction is synchronized with the occurring event. The tag combiner is coupled to the event and instruction detectors to combine the event and instruction match tags to generate the performance tag.

The instruction is a micro operation and the retired instruction may be correctly or incorrectly predicted. The performance tag generates one of an interrupt and a breakpoint. The event is one of an externally visible event and an internally visible event. The externally visible event includes a cache miss, a data translation look-aside buffer miss, a segmentation conflict, a floating point replay, a memory order buffer load replay, a segmentation and address translation replay, an address generator unit and cache miss, a data cache address and control replay, a source dependency replay, a misprediction, an instruction tagging, and a precise sampling enabling. The internally visible event includes a writeback conflict, a de-pipeline conflict, an execution unit jump, a control register access, and a store forwarding guard. The instruction is one of a load, a store address, a store data, a micro jump, a macro jump, a transfer, a jump, a floating-point operation, a long latency integer operation, an arbitrary latency operation, a control register operation, and a fireball operation.

A performance counter is coupled to the retirement performance monitor to count the performance tag. The performance counter can be accessed by a performance monitor program to measure the statistics of the performance data.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

FIG. 1 is a diagram illustrating a computer system 100 in which one embodiment of the invention can be practiced. The computer system 100 includes a processor 105, a host bus 110, a host bridge chipset 120, a system memory 130, a primary PCI bus #0 155, K PCI slots $160_1$ to $160_K$, a PCI-to-ISA bridge 170, mass storage devices 172, Input/Output (I/O) ports 174, an ISA bus 180, and ISA slots $185_1$ to $185_M$.

The processor 105 represents a central processing unit of any type of architecture, such as complex instruction set computers (CISC), reduced instruction set computers (RISC), very long instruction word (VLIW), or hybrid architecture. The processor 105 may have a processor monitor circuit 108 which contains a performance monitor circuit that provides performance data. Typically the processor 105 has a speculative architecture having prediction logic to predict execution of an instruction. In one embodiment, the instruction is a micro operation. The prediction may be correct or incorrect. A bogus tag is associated with an instruction to indicate whether it has been correctly or incorrectly predicted. When the prediction is incorrect, although the instruction may have already been executed, it is labeled as a bogus instruction. When the prediction is correct, it is labeled as a non-bogus instruction. Eventually, the instruction is retired in a retirement array together with its bogus tag. The performance monitor then has the option to report the performance data associated with bogus and/or non-bogus instructions.

The host bridge chipset 120 includes a number of interface circuits to allow the host processor 105 access to the system memory 130 and the primary PCI bus #0 155. The system memory 130 represents one or more mechanisms for storing information. For example, the system memory 130 may include non-volatile or volatile memories. Examples of these memories include flash memory, read only memory (ROM), or random access memory (RAM). The system memory 130 contains a performance monitor program 131, and other programs and data 138. Of course, the system memory 130 preferably contains additional software (not shown), which is not necessary to understanding the invention. The performance monitor program 131 may be part of an operating system or an application program that monitors the performance of the processors. The performance monitor program 131 may interact with the processor monitor circuit 108 to obtain performance data.

The PCI slots $160_1$ to $160_K$ provide interfaces to PCI devices. Examples of PCI devices include the network interface and the media interface. The network interface connects to communication channel such as the Internet. The Internet provides access to on-line service providers, Web browsers, and other network channels. The media interface provides access to audio and video devices.

The PCI-to-ISA bridge 170 provides access to the ISA bus 180, mass storage devices 172, and I/O ports 174. The mass storage devices 172 include CD ROM, floppy diskettes, and hard drives. The ISA bus 180 has a number of ISA slots $185_1$ to $185_M$ to interface to ISA devices. Examples of ISA devices include data entry devices (e.g., keyboard, mouse), printers, etc.

Figure 2:
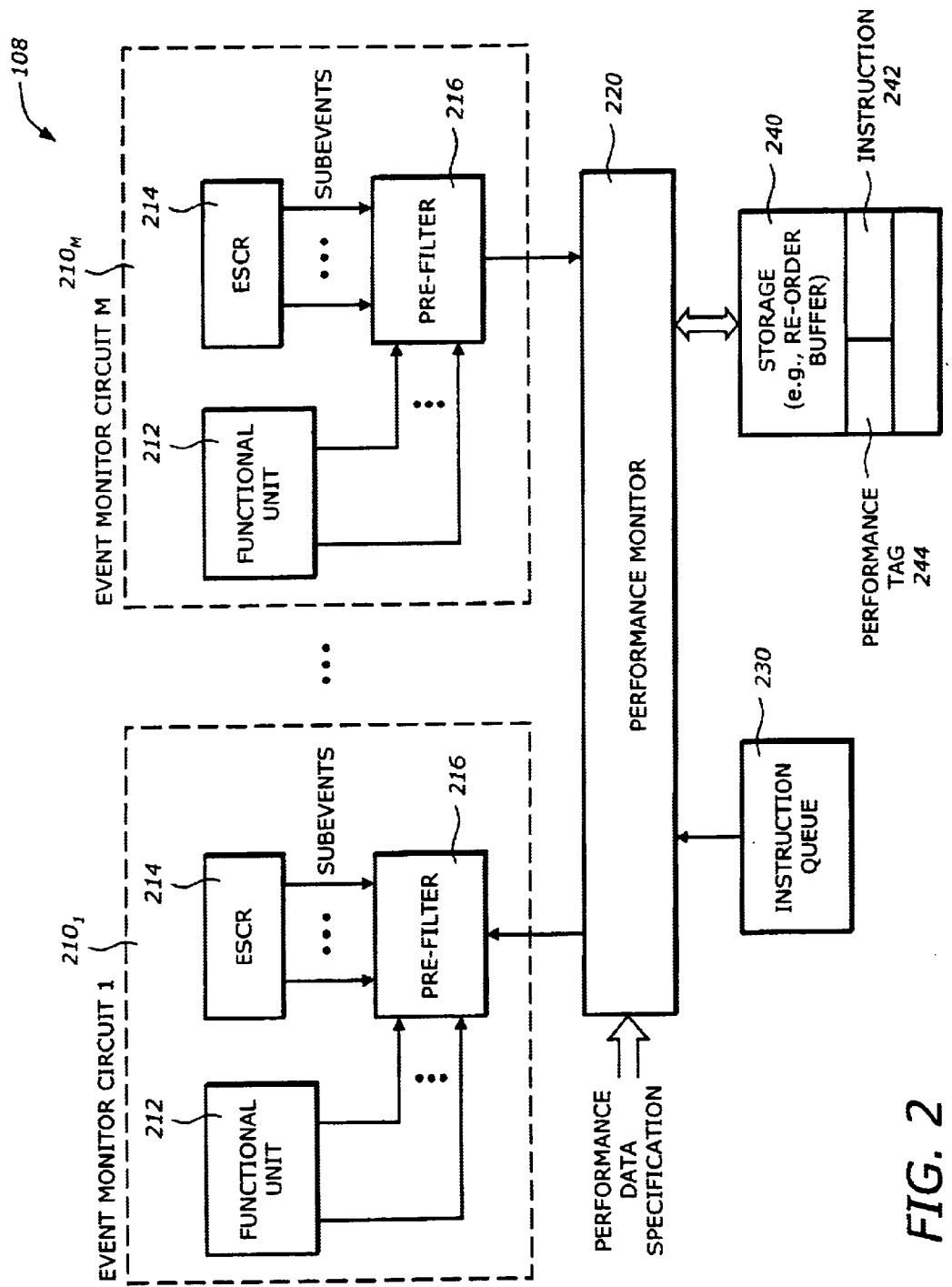
FIG. 2 is a diagram illustrating a processor having a performance monitor circuit according to one embodiment of the invention.

FIG. 2 is a diagram illustrating a processor monitor circuit 108 having a performance monitor circuit according to one embodiment of the invention. The processor monitor circuit 108 includes M event monitor circuits $210_1$ to $210_M$, a performance monitor circuit 220, an instruction queue 230, and a storage 240.

The event monitor circuits $210_1$ to $210_M$ generate occurring events during the execution stream of the processor. The event monitor circuits $210_1$ to $210_M$ operate in synchronization with the instruction pipelines in the processor. Each of the event monitor circuits $210_1$ to $210_M$ include a functional unit 212, an event specific control register (ESCR) 214, and a pre-filter 216. The functional unit 212 provides the environment in which the event takes place and the performance data is to be collected. Examples of the functional unit 212 are a memory, a level 0 cache, a level 1 cache, an execution unit, and a translation look-aside buffer (TLB). The ESCR 214 provides control, command, or configuration bits corresponding to the sub-events that may be generated by the functional unit. The pre-filter 216 receives information from the ESCR 214 and the functional unit 212 during the execution of an instruction to capture the occurring event. The event monitor circuits $210_1$ to $210_M$ generate the occurring events at the corresponding functional units to the performance monitor circuit 220.

The performance monitor circuit 220 receives the performance data specification from a performance monitor. The performance data specification provides the specific performance data to be monitored. The performance data includes an event and an instruction causing the event. The performance monitor circuit 220 receives the occurring events from the event monitor circuits $210_1$ to $210_M$ and the instructions from the instruction queue 230 to generate a performance tag to the storage 240. The performance monitor circuit 220 subsequently reads or extracts the performance tag from the storage 240 when the instruction is retired. The performance monitor circuit 220 then has the option to report the performance data associated with bogus and/or non-bogus instructions.

The instruction queue 230 stores the instructions to be executed. The instruction queue 230 is part of an instruction pipeline mechanism that synchronizes the execution of the instruction with the event generation in the corresponding functional unit(s) in the event monitor circuits $210_1$ to $210_M$. In one embodiment, the instruction queue 230 is a micro operation (uOp) staging queue that buffers the uOps issued from the instruction decoder unit.

The storage 240 stores the instruction 242 and its corresponding performance tag 244 as provided by the performance monitor circuit 220. In one embodiment, the storage 240 is a re-order buffer that stores executed instructions. The instructions stored in the re-order buffer may be retired in a retirement array. When a speculative instruction is incorrectly predicted, it is stored in the re-order buffer together with a bogus tag 245 indicating the misprediction and labeled as a bogus instruction. When an instruction is retired, it is stored in the retirement array together with it bogus tag 245. the performance monitor circuit 220 examines the bogus tag 245 and determines if the instruction is a non-bogus or bogus instruction. When the instruction 242 is retired, its corresponding performance tag 244 is read by the performance monitor circuit 220 as a performance data. Using the bogus tag, the performance monitor circuit 220 then has the option to report the performance data associated with bogus and/or non-bogus instructions.

Figure 3:
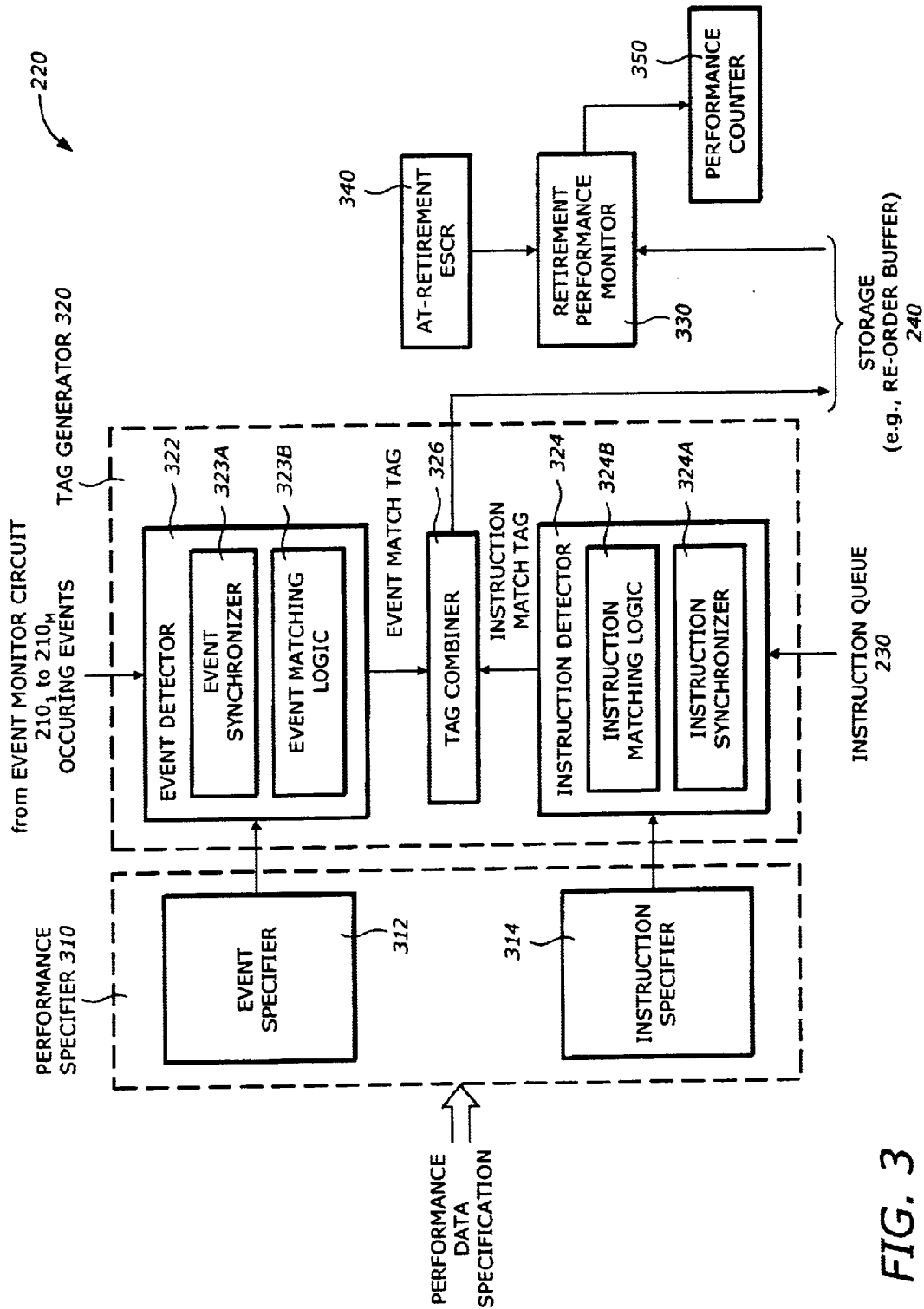
FIG. 3 is a diagram illustrating a performance monitor circuit shown in FIG. 2 according to one embodiment of the invention.

FIG. 3 is a diagram illustrating a performance monitor circuit 220 shown in FIG. 2 according to one embodiment of the invention. The performance monitor circuit 220 includes a performance specifier 310, a tag generator 320, a retirement performance monitor 330, an at-retirement ESCR 340, and a performance counter 350.

The performance specifier 310 receives the performance data specification and generates a performance data corresponding to the performance monitored by the performance monitor circuit 220. The performance data includes an event and an instruction causing the event.

The performance specifier 310 includes an event specifier 312 and an instruction specifier 314. The event specifier 312 specifies the event relating to the performance. Several events may be specified at the same time in which case the performance data are collected and reported for multiple events. As will be discussed later in connection with FIG. 5, the event specifier 312 may be a register having M bits corresponding to M events. Examples of an event include level 0 cache miss, segmentation conflict, and a branch misprediction. An event is typically associated with one or more functional units. For example, a level 0 cache miss is associated with the level 0 cache, a branch misprediction is associated with the branch prediction logic. The instruction specifier 314 specifies an instruction that causes the event. One or more instructions may be specified. As will be discussed later in connection with FIG. 5, the instruction specifier 314 may be a register having L bits corresponding to L instructions. In one embodiment, the instruction is a micro operation (uOp). Examples of a uOp include a load uOp, a store uOp, and a floating-point uOp. A performance data therefore is a quantitative measurement of the occurrence of an event caused by an instruction. For example, a performance data may be the occurrence of a level 0 cache miss caused by a load uOp.

The tag generator 320 generates a performance tag to be stored in the storage 240. The performance tag is subsequently read or extracted when the corresponding instruction is retired. The tag generator 320 includes an event detector 322, an instruction detector 324, and a tag combiner 326.

The event detector 322 receives the occurring events as generated by the event monitor circuits $210_1$ to 210M and the specified event from the event specifier 312. The event detector 322 includes an event synchronizer 323A and an event matching logic 323B. The event synchronizer 323A synchronizes the occurring events together and with the instruction. The event matching logic 323B matches or compares the synchronized occurring event or events with the specified event or events. The event detector 322 generates an event match tag. In one embodiment, there are multiple specified events and the event detector 322 matches the specified events with multiple occurring events from the event monitor circuits $210_1$ to $210_M$ and generates an event match tag containing match bits corresponding to matched events. If there is a match, the event detector 322 asserts the event match tag. If there is no match, the event detector 322 de-asserts the event match tag.

The instruction detector 324 receives the instruction being executed from the instruction queue 230 and the specified instruction from the instruction specifier 314. The instruction detector 324 includes an instruction synchronizer 324A and an instruction matching logic 324B. The instruction synchronizer 324A synchronizes the instruction with the occurring event or events generated from the event monitor circuits $210_1$ to $210_M$. The instruction matching logic 324B matches the specified instruction with the executed instruction. The instruction detector 324 generates an instruction match tag based on the result of the matching logic 324B. If there is a match, the instruction detector 324 asserts the instruction match tag. If there is no match, the instruction detector 324 de-asserts the instruction match tag.

The tag combiner 326 combines the event match tag and the instruction match tag and generates the performance tag. The tag combiner 326 may be a decoder with decoding logic taking a combination of the event match tag and the instruction match tag to provides a decoded performance tag. The tag combiner 326 may also be a logic circuit such as an AND-OR logic circuit.

The retirement performance monitor 330 receives control information from the retirement ESCR 340 and reads the performance tag from the storage 240 when the corresponding instruction is retired. In addition, the retirement performance monitor 330 examines the bogus tag associated with each instruction to determine if the instruction has been correctly or incorrectly predicted. If the instruction is speculatively executed, upon recognition of a misprediction, the instruction is labeled bogus. The retirement performance monitor 330 records the performance tag and has the option to report the performance tag associated with bogus and/or non-bogus instructions. This recorded performance tag can be read by another circuit or a monitoring program. To facilitate the recording of accumulated performance data, the retirement performance monitor 330 can provide the performance information to the performance counter 350. The performance counter 350 may be part of an existing performance monitor. The performance counter 350 counts the number of performance data using the performance tag.

The performance monitor circuit 220 can also be used to provide precise and imprecise performance data. A precise performance data corresponds to an event whose cause can be precisely pinpointed to a particular instruction or uOp. An imprecise performance data corresponds to event whose cause cannot be precisely pinpointed to a particular instruction or uOp. To provide precise performance data, the performance monitor circuit 220 can be given an interrupt or break-point capability. For example, the performance tag can be used as an interrupt signal to interrupt the processor, or to trigger a break-point in an instruction sequence. When not all instructions can be interrupted such as in a macro instruction, the performance monitor program may have to wait for several instructions to be retired before a safe interrupt can be generated. This is referred to imprecise performance monitor. A precise performance data is useful to determine the precise cause of an event. For example, when there are a lot of cache misses, it is useful for a monitor program to precisely determine which instruction or uOp that causes or mainly responsible for the cache misses.

Figure 4:
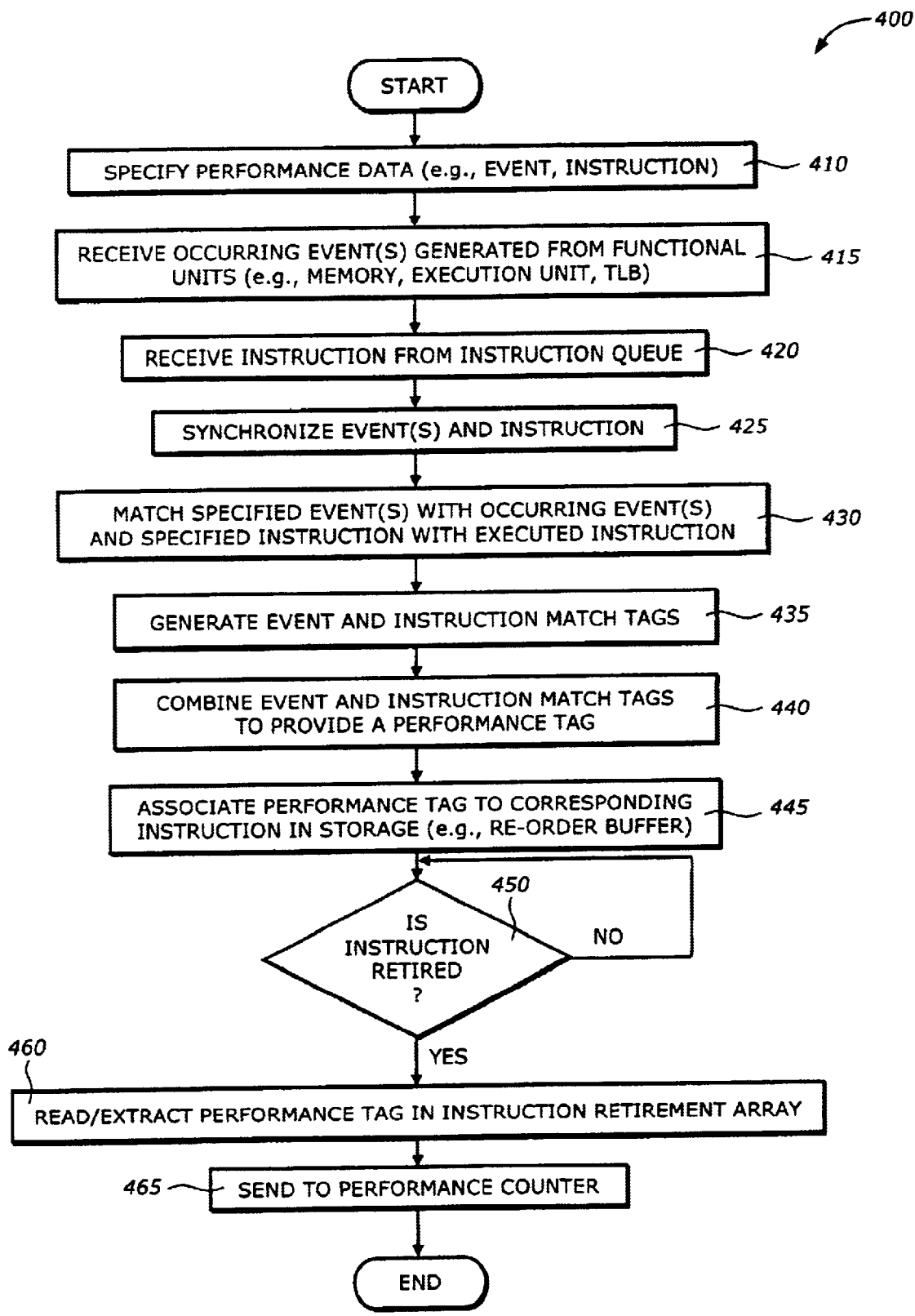
FIG. 4 is a flowchart illustrating a process to monitor performance of a processor according to one embodiment of the invention.

FIG. 4 is a flowchart illustrating a process 400 to monitor performance of a processor according to one embodiment of the invention.

Upon START, the process 400 specifies performance data including an event and an instruction (Block 410). The performance data corresponds to the performance to be monitored. Then the process 400 receives an occurring event generated from one of the functional units (Block 415). These functional units include a memory, an internal cache, an external cache, an execution unit, and a translation look-aside buffer. Next, the process 400 receives an executed instruction from an instruction queue (Block 420). Then, the process 400 synchronizes the occurring event and the executed instruction (Block 425). The synchronization is performed using signals from the functional pipeline and the instruction pipeline.

Next, the process 400 matches the specified event with the occurring event and the specified instruction with the executed instruction (Block 430). Then, the process 400 generates event and instruction match tags based on the result of the matching (Block 435). The process 400 combines the event and instruction match tags to provide a performance tag (Block 440). Then, the process 400 associates the performance tag with the corresponding instruction at a storage (Block 445).

Next, the process 400 determines if the executed instruction is retired (Block 450). If not, the process 400 returns back to block 450 and continues monitoring the instruction retirement. Otherwise, if the instruction retires the process 400 extracts the performance tag in the instruction retirement array (Block 460). Then the process 400 sends the performance tag to a performance counter to accumulate the performance data (Block 465). The process 400 is then terminated.

Figure 5:
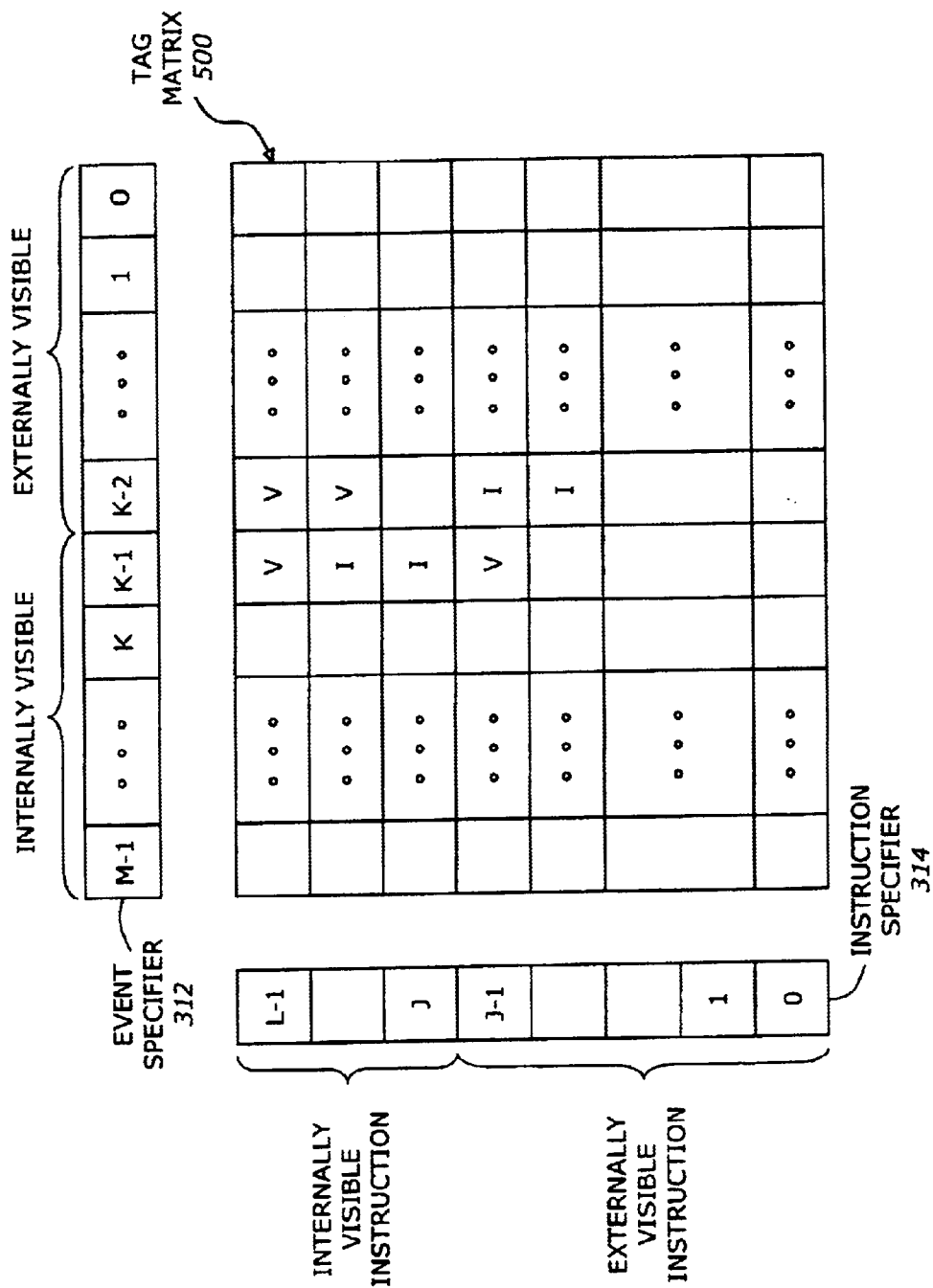
FIG. 5 is a diagram illustrating a tagging matrix for the performance specifier shown in FIG. 3 according to one embodiment of the invention.

FIG. 5 is a diagram illustrating a tagging matrix 500 for the performance specifier shown in FIG. 3 according to one embodiment of the invention. The replay tagging matrix 500 is a two-dimensional logical construction of the combination of the event specifier 312 and the instruction specifier 314.

Replay is a concept that corresponds to the re-execution or re-scheduling of an instruction. When an instruction is executed, it generates an event. When it is re-executed, it generates another event which may be the same or different than the previous event because the state of the corresponding event monitor circuit may be the same or may be different. For example, a floating-point replay is the repeated executions of a floating-point operation that may cause the same or different events in the floating-point execution unit. The performance monitor circuit 220 shown in FIG. 2 reports a repeated but same occurrence of an event as a single incident as reflected by the performance tag. To keep track of the accumulation of the events, an accumulation mechanism such as the performance counter 350 shown in FIG. 3 should be used. The tagging matrix 500 is a logical visualization of all possible combinations of events and instructions and may be useful as a design aid for performance monitor program writer. The tagging matrix 500 is essentially a map that shows the results generated by the tag generator 320 shown in FIG. 3.

The event specifier 312 may be a register having M bits, each bit corresponding to an event. A performance monitor program such as the performance monitor program 131 shown in FIG. 1 may access the event specifier 312 to configure the M-bit register. The event specifier 312 may be divided into two fields, one is for internally visible events and one is for externally visible events. Internally visible events are those that can only be observed by personnel of the processor. Externally visible events are those that can be observed and accessed by users of the processor. Examples of externally visible events include cache miss, data translation look-aside buffer miss, segmentation conflict, floating point replay, memory order buffer load replay, segmentation and address translation replay, address generator unit and cache miss, data cache address and control replay, source dependency replay, misprediction, instruction tagging, and precise sampling enabling. Examples of internally visible events include writeback conflict, de-pipeline conflict, execution unit jump, control register access, and store forwarding guard.

The instruction specifier 314 may be a register having L bits, each bit corresponding to an instruction. A performance monitor program such as the performance monitor program 131 shown in FIG. 1 may access the instruction specifier 314 to configure the L-bit register. The instruction specifier 314 may be divided into two fields, one is for internally visible instructions and one is for externally visible instructions. Internally visible instructions are those that can only be monitored by personnel of the processor's manufacturer. Externally visible instructions are those that can be monitored by users of the processor.

The tag matrix 500 provides a visualization of all possible combinations of performance data. A performance data corresponds to an occurrence of an event caused by an instruction. Since not all instructions can cause all events, some combinations may not be valid or meaningful. Selecting these combinations result in no effect. For example, a load instruction should have no effect on the floating-point functional unit. Therefore a combination of a load instruction and a floating-point replay event is meaningless, and results in no effect. As illustrated in FIG. 5, the combination of the event K-1 and the instruction L-1 is a valid (V) combination while the combination of the event K-2 and the instruction J-1 is an invalid (I) combination.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus to monitor performance of a processor, comprising:

a performance specifier to specify a performance data corresponding to the performance, the performance data including an event and an instruction causing the event;

a tag generator coupled to the performance specifier to generate a performance tag associated with the instruction, the performance tag being stored in a storage; and a retirement performance monitor coupled to the storage to extract the performance tag when the instruction is retired, wherein the retired instruction is one of correctly or incorrectly predicted, and a bogus tag is associated with the retired instruction to indicate whether the retired instruction was correctly or incorrectly predicted and if the retired instruction was incorrectly predicted the retired instruction is a bogus instruction;

wherein only the performance tag associated with the bogus instruction is reported to a performance counter coupled to the retirement performance monitor to count the performance tag such that performance data is counted.

2. The apparatus of claim 1 wherein the performance specifier comprises:

an event specifier to specify the event; and an instruction specifier to specify the instruction causing the event.

3. The apparatus of claim 2 wherein the tag generator comprises:

an event detector coupled to the event specifier to match the specified event with an occurring event generated from a functional unit, the event detector generating an event match tag;

an instruction detector coupled to the instruction specifier to match the specified instruction with an executed instruction, the instruction detector generating an instruction match tag, the executed instruction being synchronized with the occurring event; and a tag combiner coupled to the event and instruction detectors to combine the event and instruction match tags to generate the performance tag.

4. The apparatus of claim 1 wherein the performance tag generates one of an interrupt and a break-point.

5. The apparatus of claim 4 wherein the event is one of an externally visible event and an internally visible event.

6. The apparatus of claim 5 wherein the externally visible event includes a cache miss, a data translation look-aside buffer miss, a segmentation conflict, a floating point replay, a memory order buffer load replay, a segmentation and address translation replay, an address generator unit and cache miss, a data cache address and control replay, a source dependency replay, a misprediction, an instruction tagging, or a precise sampling enabling.

7. The apparatus of claim 5 wherein the internally visible event includes a writeback conflict, a de-pipeline conflict, an execution unit jump, a control register access, or a store forwarding guard.

8. The apparatus of claim 5 wherein the instruction is one of a load, a store address, a store data, a micro jump, a macro jump, a transfer, a jump, a floating-point operation, a long latency integer operation, an arbitrary latency operation, a control register operation, or a fireball operation.

9. A method to monitor performance of a processor, comprising:
    specifying a performance data corresponding to the performance by a performance specifier, the performance data including an event and an instruction causing the event;
    generating a performance tag associated with the instruction by a tag generator, the performance tag being stored in a storage;
    extracting the performance tag by a retirement performance monitor when the instruction is retired, wherein the retired instruction is one of correctly or incorrectly predicted, and a bogus tag is associated with the retired instruction to indicate whether the retired instruction was correctly or incorrectly predicted and if the retired instruction was incorrectly predicted the retired instruction is a bogus instruction; and
    reporting only the performance tag associated with the bogus instruction to a performance counter coupled to the retirement performance monitor to count the performance tag such that performance data is counted.

10. The method of claim 9 wherein specifying the performance data comprises:
    specifying the event by an event specifier; and
    specifying the instruction causing the event by an instruction specifier.

11. The method of claim 10 wherein generating the performance tag comprises:
    matching the specified event with an occurring event generated from a functional unit by an event detector, the event detector generating an event match tag;
    matching the specified instruction with an executed instruction by an instruction detector, the instruction detector generating an instruction match tag, the executed instruction being synchronized with the occurring event; and
    combining the event and instruction match tags by a tag combiner to generate the performance tag.

12. The method of claim 9 wherein the performance tag generates one of an interrupt and a break-point.

13. The method of claim 12 wherein the event is one of an externally visible event and an internally visible event.

14. The method of claim 13 wherein the externally visible event includes a cache miss, a data translation look-aside buffer miss, a segmentation conflict, a floating point replay, a memory order buffer load replay, a segmentation and address translation replay, an address generator unit and cache miss, a data cache address and control replay, a source dependency replay, a misprediction, an instruction tagging, or a precise sampling enabling.

15. The method of claim 13 wherein the internally visible event includes a writeback conflict, a de-pipeline conflict, an execution unit jump, a control register access, or a store forwarding guard.

16. The method of claim 13 wherein the instruction is one of a load, a store address, a store data, a micro jump, a macro jump, a transfer, a jump, a floating-point operation, a long latency integer operation, an arbitrary latency operation, a control register operation, or a fireball operation.

17. A processor monitor circuit in a processor comprising:
    a plurality of event monitor circuits having a corresponding plurality of functional units;
    an instruction queue to store instructions to be executed; and
    a performance monitor circuit coupled to the plurality of event monitor circuits and the instruction queue to monitor performance of the processor, the performance monitor circuit comprising:
        a performance specifier to specify a performance data corresponding to the performance, the performance data including an event and an instruction causing the event,
        a tag generator coupled to the performance specifier to generate a performance tag associated with the instruction, the performance tag being stored in a storage, and
        a retirement performance monitor coupled to the storage to extract the performance tag when the instruction is retired, wherein the retired instruction is one of correctly or incorrectly predicted, and a bogus tag is associated with the retired instruction to indicate whether the retired instruction was correctly or incorrectly predicted and if the retired instruction was incorrectly predicted the retired instruction is a bogus instruction;
        wherein only the performance tag associated with the bogus instruction is reported to a performance counter coupled to the retirement performance monitor to count the performance tag such that performance data is counted.

18. The processor monitor circuit of claim 17 wherein the performance specifier comprises:
    an event specifier to specify the event; and
    an instruction specifier to specify the instruction causing the event.

19. The processor monitor circuit of claim 18 wherein the tag generator comprises:
    an event detector coupled to the event specifier to match the specified event with an occurring event generated from at least one of the functional units, the event detector generating an event match tag;
    an instruction detector coupled to the instruction specifier to match the specified instruction with an executed instruction, the instruction detector generating an instruction match tag, the executed instruction being synchronized with the occurring event; and
    a tag combiner coupled to the event and instruction detectors to combine the event and instruction match tags to generate the performance tag.

20. The processor monitor circuit of claim 17 wherein the performance tag generates one of an interrupt and a break-point.

21. The processor monitor circuit of claim 20 wherein the event is one of an externally visible event and an internally visible event.

22. The processor monitor circuit of claim 21 wherein the externally visible event includes a cache miss, a data translation look-aside buffer miss, a segmentation conflict, a floating point replay, a memory order buffer load replay, a segmentation and address translation replay, an address generator unit and cache miss, a data cache address and control replay, a source dependency replay, a misprediction, an instruction tagging, or a precise sampling enabling.

23. The processor monitor circuit of claim 21 wherein the internally visible event includes a writeback conflict, a de-pipeline conflict, an execution unit jump, a control register access, or a store forwarding guard.

24. The processor monitor circuit of claim 21 wherein the instruction is one of a load, a store address, a store data, a micro jump, a macro jump, a transfer, a jump, a floating-point operation, a long latency integer operation, an arbitrary latency operation, a control register operation, and a fireball operation.

* * * * *